United States Patent
Brunken, Jr.

(10) Patent No.: US 7,109,619 B2
(45) Date of Patent: Sep. 19, 2006

(54) DAMPER SUPPORT ASSEMBLY FOR A SUPERCRITICAL DRIVE SHAFT

(75) Inventor: John Elton Brunken, Jr., Colleyville, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 29 days.

(21) Appl. No.: 10/798,279

(22) Filed: Mar. 12, 2004

(65) Prior Publication Data

US 2005/0200219 A1 Sep. 15, 2005

(51) Int. Cl.
*H02K 5/16* (2006.01)

(52) U.S. Cl. ............... 310/90; 310/91; 310/51; 464/180; 248/638; 384/581

(58) Field of Classification Search ............ 310/90, 310/91, 51, 90.5; 464/180, 178; 248/637, 248/638, 562; 384/535, 536, 581, 582
See application file for complete search history.

(56) References Cited

U.S. PATENT DOCUMENTS

| | | | | |
|---|---|---|---|---|
| 1,845,551 A | * | 2/1932 | Mitzi | 248/568 |
| 2,725,266 A | | 11/1955 | Mendelsohn | 300/90.5 |
| 3,069,016 A | * | 12/1962 | Kiesskalt et al. | 210/370 |
| 3,811,740 A | | 5/1974 | Sacerdoti et al. | 300/90.5 |
| 3,830,595 A | * | 8/1974 | Carpenter et al. | 417/363 |
| 4,145,626 A | | 3/1979 | Aroshidze et al. | 30/91 |
| 4,202,551 A | | 5/1980 | Darnall, Jr. | 367/263.1 |
| 4,214,796 A | * | 7/1980 | Monzel et al. | 384/202 |
| 4,236,426 A | * | 12/1980 | Meinke et al. | 192/30 R |
| 4,278,726 A | | 7/1981 | Wieme | 629/300.7 |
| 4,406,642 A | | 9/1983 | McNall | 464/480 |
| 4,425,813 A | * | 1/1984 | Wadensten | 74/87 |
| 4,430,011 A | * | 2/1984 | Kun | 384/99 |
| 4,442,367 A | | 4/1984 | Suzuki | 310/91 |
| 4,457,667 A | * | 7/1984 | Seibert et al. | 415/229 |
| 4,506,857 A | | 3/1985 | Hara et al. | 248/655 |
| 4,726,112 A | | 2/1988 | King et al. | 29/596 |
| 4,978,581 A | | 12/1990 | Fukahori et al. | 428/492 |
| 5,177,387 A | | 1/1993 | McMichael et al. | 310/90.5 |
| 5,495,221 A | | 2/1996 | Post | 335/299 |
| 5,506,459 A | | 4/1996 | Ritts | 310/90.5 |
| 5,521,447 A | | 5/1996 | Bertolini et al. | 310/51 |
| 5,521,448 A | | 5/1996 | Tecza et al. | 310/90.5 |
| 5,821,647 A | * | 10/1998 | Takehara et al. | 310/67 R |
| 5,847,476 A | | 12/1998 | Elsing et al. | 310/51 |

(Continued)

*Primary Examiner*—Dang Le
(74) *Attorney, Agent, or Firm*—Pillsbury Winthrop Shaw Pittman LLP (57) ABSTRACT

A support system, a bracket assembly, and a damping member for use in supporting a rotating shaft. A support system including a fixed bracket; a bracket assembly; and a bearing. The bracket assembly having a first damping member having a first fixed end and a second movable end, the first fixed end being securably attached to the fixed bracket and the second movable end being movable in a first plane aligned with the shaft. The bracket assembly further having a brace securably attached to the second movable end of the first damping member. The bracket assembly further having a second damping member having a first end and a second end, the first end being securably attached to the brace and the second end being movable in a second plane that is aligned with the shaft and is generally perpendicular to the first plane. The bearing being securably attached to the second end of the second damping member and being constructed and arranged to provide a mechanical interconnection between the second end of the damping member and the shaft.

21 Claims, 9 Drawing Sheets

U.S. PATENT DOCUMENTS

| | | | |
|---|---|---|---|
| 5,847,480 A | 12/1998 | Post | 310/90.5 |
| 5,900,685 A * | 5/1999 | Evans et al. | 310/51 |
| 6,057,618 A | 5/2000 | Brunken, Jr. | 310/90.5 |
| 6,126,136 A | 10/2000 | Yen et al. | 248/560 |
| 6,268,676 B1 | 7/2001 | Brunken, Jr. | 310/90.5 |
| 6,425,568 B1 | 7/2002 | Brunken, Jr. | 248/562 |
| 6,427,308 B1 | 8/2002 | Brunken, Jr. | 29/434 |

* cited by examiner

DAMPER SUPPORT ASSEMBLY FOR A SUPERCRITICAL DRIVE SHAFT

This application is related to commonly assigned U.S. Pat. Nos. 6,057,618; 6,268,676; 6,427,308: and 6,425,568 to Brunken, Jr. and each of these patents is incorporated herein by reference thereto, respectively.

FIELD OF THE INVENTION

The present invention relates to the damping of drive shafts. More specifically, the illustrated embodiments of the present invention relate to a support system for a rotating shaft, a bracket assembly for supporting a rotating shaft, and a damping member for use in providing damping support for a shaft.

SUMMARY

One aspect of the subject invention includes a support system for a rotating shaft, comprising: a fixed bracket; a bracket assembly having a first damping member having a first fixed end and a second movable end, the first fixed end being securably attached to the fixed bracket and the second movable end being movable in a first plane aligned with the shaft, the bracket assembly having a brace securably attached to the second movable end of the first damping member, the bracket assembly further having a second damping member having a first end and a second end, the first end being securably attached to the brace and the second end being movable in a second plane that is aligned with the shaft and is generally perpendicular to the first plane; and a roller bearing securably attached to the second end of the second damping member, the roller bearing being constructed and arranged to provide a mechanical interconnection between the second end of the damping member and the shaft.

Another aspect of the subject invention includes a bracket assembly for supporting a rotating shaft, comprising: a first damping member having a first end and a second end, the first end being configured to be securably attached to a fixed bracket and the second end being configured to be movable in a first plane aligned with the shaft; a brace securably attached to the second end of the first damping member, the brace having an opening so that the shaft can pass through the brace; and a second damping member having a first end and a second end, the first end being securably attached to the brace and the second end being configured to be movable in a second plane that is aligned with the shaft and that is generally perpendicular to the first plane, the first damping member including a first plate member and a first damping element positioned within the first plate member and the second damping member including a second plate member and a second damping element positioned within the second plate member; the first plate member, the second plate member, and the brace together forming a one-piece, unitary bracket element.

Another aspect of the subject invention includes a support system for a rotating shaft, comprising: a fixed bracket; a bracket assembly having a first damping member having a first end and a second end, the first end being securably attached to the fixed bracket and the second end being configured to be movable in a first plane aligned with the shaft, a brace securably attached to the second end of the first damping member, and a second damping member having a first end and a second end, the first end being securably attached to the brace and the second end being configured to be movable in a second plane that is aligned with the shaft and that is generally perpendicular to the first plane, the first damping member including a first plate member and a first damping element positioned within the first plate member and the second damping member including a second plate member and a second damping element positioned within the second plate member, the first plate member, the second plate member, and the brace together forming a one-piece, unitary bracket element; and a bearing having a first bearing portion securably attached to the second end of the second damping member, and a second bearing portion structured and arranged to be securably attached to the shaft.

Another aspect of the subject invention includes a first elastomeric member; and a first plate member having a top, a bottom, a front, a rear, a first side, and a second side, each of the front and rear being configured to be securably fastened to other elements, the first plate member having a central opening extending completely through the first plate member between a first aperture in the first side and a second aperture in the second side, and the first plate member being formed as a one-piece, unitary member, and the first elastomeric member being positioned within the central opening.

Another aspect of the subject invention includes a support system for a rotating shaft, comprising: a fixed bracket; a first damping member having a first end and a second end, the first end being securably attached to the fixed bracket and the second end being configured to be movable in a first plane aligned with the shaft, a floating bracket securably attached to the second end of the first damping member, and a second damping member having a first end and a second end, the first end being securably attached to the floating bracket and the second end being configured to be movable in a second plane that is aligned with the shaft and that is generally perpendicular to the first plane, the first damping member including a first plate member and a first damping element positioned within the first plate member and the second damping member including a second plate member and a second damping element positioned within the second plate member, each of the first plate member and the second plate member being formed as a one-piece, unitary plate member; and a bearing having a first bearing portion securably attached to the second end of the second damping member, and a second bearing portion structured and arranged to be securably attached to the shaft.

Other aspects, features, and advantages of the present invention will become apparent from the following detailed description of the illustrated embodiment, the accompanying drawings, and the appended claims.

DESCRIPTION OF ILLUSTRATED EMBODIMENTS

Figure 1:
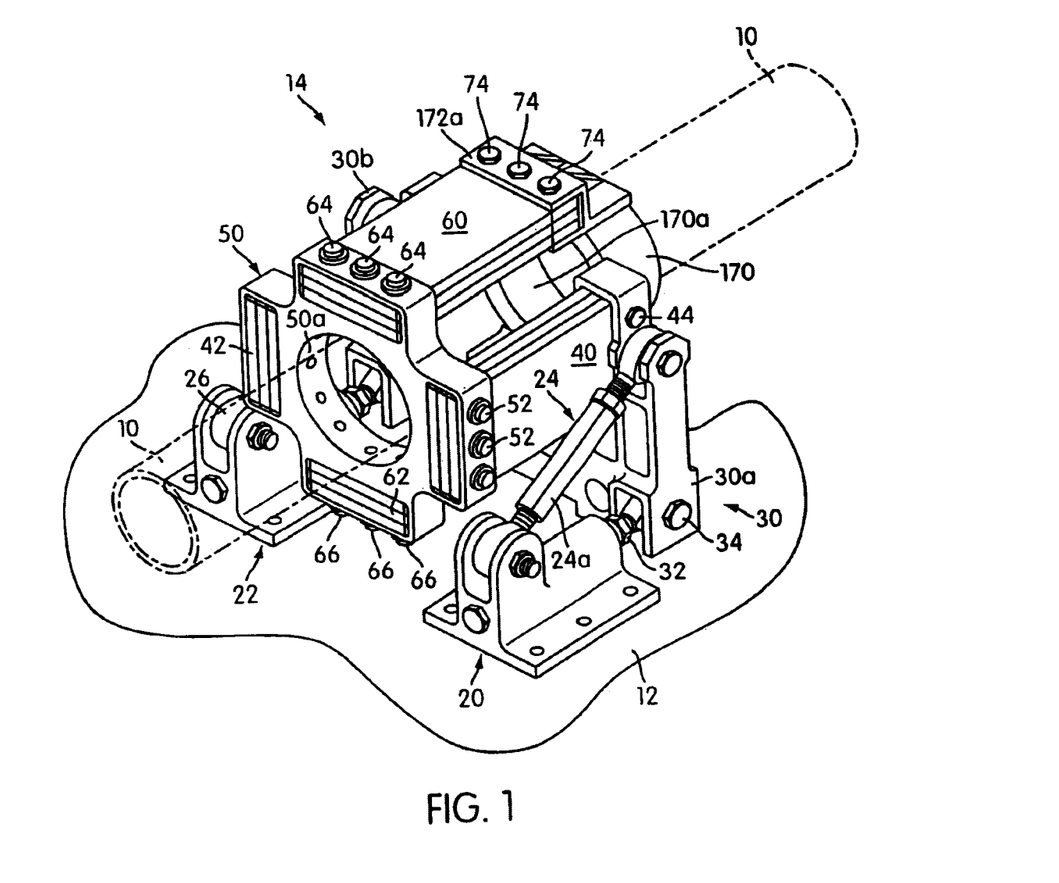
FIG. 1 shows a view of a support system in accordance with one illustrated embodiment of the present invention.

Referring to FIG. 1 of the drawings, the reference numeral 10 refers to a shaft which is supported for rotation relative to a support member, or plate, 12. For the purpose of example it is assumed that the shaft 10 is the tail rotor drive shaft of a helicopter or the interconnecting drive shaft of a tilt rotor aircraft, and the plate 12 is a structural support member of the helicopter or aircraft. Only one support assembly employing features of the present invention is shown, by the reference numeral 14 and is adapted to support the shaft 10 in a slightly elevated position relative to the plate 12. It should be understood that any number of support assemblies may be employed, including multiple support assemblies 14.

The support assembly 14 is generally similar, except has discussed herein, to the support assembly disclosed in the related U.S. Patents identified above, for example, U.S. Pat. No. 6,427,308, which are all incorporated herein by reference thereto. Accordingly, certain aspects of the support assembly 14 are not described in detail as they are not necessary for the understanding of the illustrated embodiments of the present invention.

FIG. 1 includes two spaced brackets 20 and 22 that are bolted to the plate 12. A pair of turnbuckles 24 and 26, of a generally conventional design, connect the brackets 20 and 22, respectively, to a bracket 30. The bracket 30 is generally U-shaped and has two spaced parallel legs 30a and 30b that extend vertically. The respective ends of the turnbuckle 24 are mounted for pivotal movement relative to the bracket 20 and the leg 30a of the bracket 30, and the respective ends of the turnbuckle 26 are mounted for pivotal movement relative to the bracket 22 and the leg 30b of the bracket 20, all in a generally conventional manner. The turnbuckles 24 and 26 include outer sleeves 24a and 26a, respectively, which, when manually rotated, axially expand or contract the turnbuckles, also in a conventional manner and for reasons to be described.

An expansion bolt 32 is in threaded engagement with a threaded bore (not shown) provided in the bracket 20 and has a head portion connected to the bracket 30 by a bolt 34 extending through aligned openings in the bracket 30 and through an opening in the head portion. An expansion bolt (not shown) similar to bolt 32 is in threaded engagement with a threaded bore (not shown) provided in the bracket 22 and has a head portion connected to the bracket 30 by a bolt (not shown) similar to bolt 34 extending through aligned openings in the bracket 30 and through an opening in the latter head portion. The expansion bolt 32 and its corresponding expansion bolt on the opposite side of the assembly 14 can be axially expanded and contracted by rotating the bolts in a conventional manner. As a result of the foregoing, expansion and contraction of the expansion bolts, including bolt 32, and the turnbuckles 24 and 26, adjust the position of the bracket 30 in an axial direction relative to the shaft 10, as well as its angular position relative to a vertical and horizontal axis.

Two horizontally-spaced, parallel damping members 40 and 42 are mounted at one of their ends to the bracket 30 by a plurality of bolts, respectively, such as bolt 44. The damping members 40 and 42 are rectangular in cross section and extend upright and horizontally. A bracket 50 is provided in a spaced relation to the bracket 30 and is connected to the other ends of the damping members 40 and 42 by a plurality of bolts, respectively, such as bolts 52. The bracket 50 has a central opening 50a for receiving the shaft 10 with ample clearance.

Two vertically-spaced, parallel damping members 60 and 62 are mounted at one end to the bracket 50 by a plurality of bolts 64 and 66, respectively. The damping members 60 and 62 are rectangular in cross section and extend horizontally relative to the shaft 10. The damping members 40, 42, 60 and 62 are angular spaced at ninety degree intervals.

A generally conventional mechanical bearing, such as a roller bearing 170 is connected to the other end of the damping members 60 and 62 by a pair of spaced mounting plates 172a and 172b, respectively, affixed to portion of the roller bearing 170 and provides a mechanical interconnection between the damping members 60 and 62 and the shaft 10. Although not shown in detail the drawings it is understood that the other end of the damping member 62 is connected to the roller bearing 170 by mounting plate 172b, which is substantially identical to plate 172a. The roller bearing 170 has a central opening 170a that receives the shaft 10 as generally known in the art.

Figure 2:
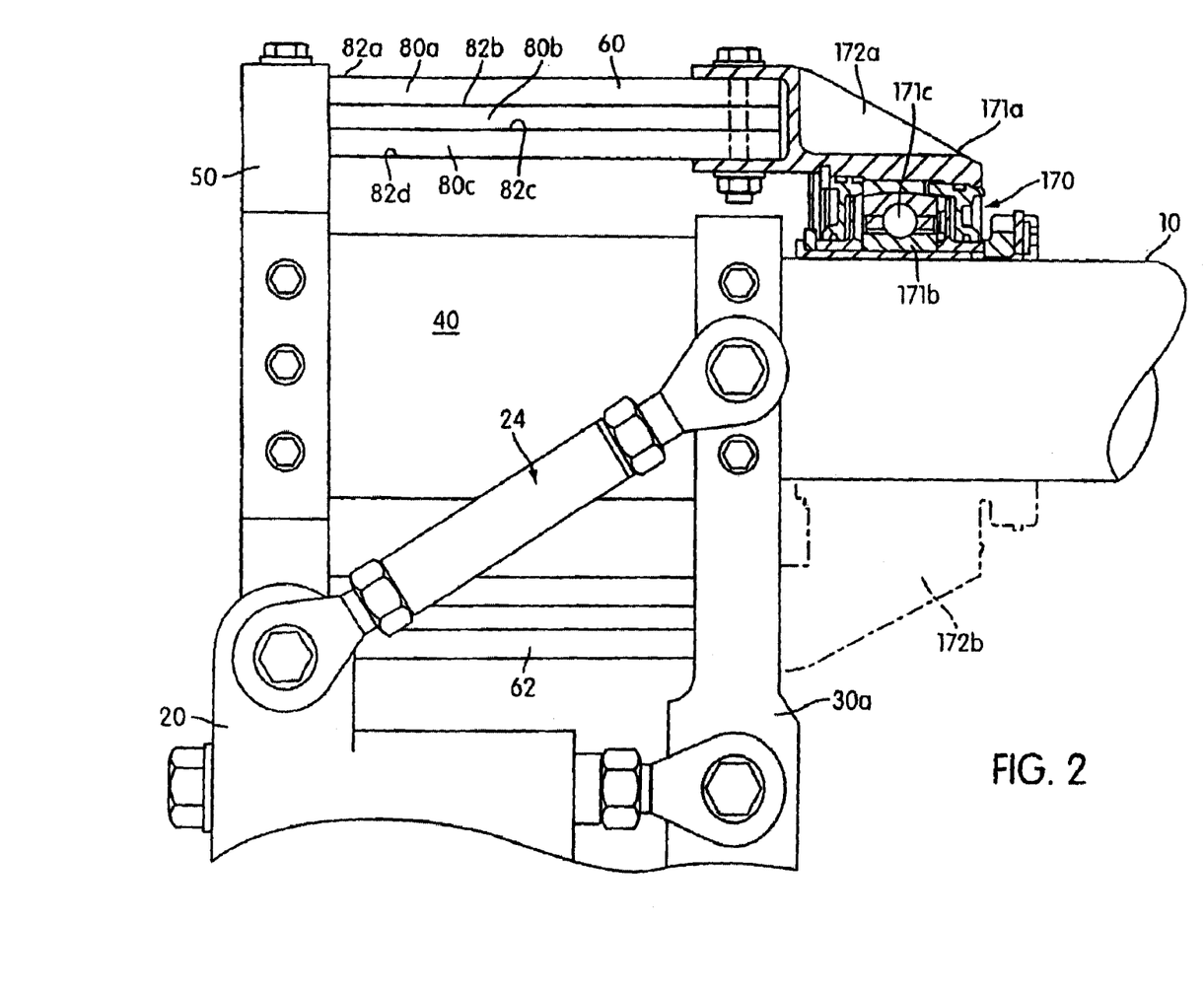
FIG. 2 is a side view of the system illustrated in FIG. 1 with a partial cross-section taken through the roller bearing.

With reference to FIGS. 1 and 2, the damping member 60 is formed by three stacked elastomeric damping pads 80a–80c. The pad 80a is sandwiched between two relatively thin, plates 82a and 82b, the pad 80b is sandwiched between the plate 82b and an additional plate 82c, and the pad 80c is sandwiched between the plate 82c and an additional plate 82d. The damping member 60 will not be completely described herein as it is fully described in the above-identified U.S. patents incorporated into the present application.

The damper member 60 has openings therethrough so as to receive the bolts 64 and 74 and thus permit a rigid mounting of the damping member 60 to the bracket 50 and to the plates 172a and 172b. It is understood that the damping members 40, 42 and 62 are substantially identical to the damping member 60 and thus will not be described in detail. The use of two damping members 40 and 42, as well as two damping members 60 and 62, allows radial movement of the roller bearing 170 without causing any tilting, or angular movement, of the bearing 170.

The mounting plates 172a and 172b and the roller bearing 170 illustrated present merely one example of a mechanical bearing assembly that can be used and the illustration and description of the roller bearing shown in FIG. 2 should not be limiting in any manner in the varieties of mechanical bearings and roller bearing assemblies that can be used to mechanically interconnect the damping plates 60 and 62 and the shaft 10. As illustrated in FIG. 2, the roller bearing 170 includes an outer race 171a that is securely and rigidly coupled to bracket plate 172a, an inner race 171b securely coupled to and rotatable with shaft 10, and ball bearings 171c positioned therebetween. The general construction of the roller bearing 170 and its interconnection with mounting plates 172a and 172b and shaft 10 are as generally know in the art.

As a result of the above, the support assembly 14 provides a mechanically-coupled support of the shaft 10 in an elevated position relative to the support plate 12 (FIG. 1), transferring radial forces to be carried from the rotating shaft 10 to the support assembly 14 which acts as a damper and a restoring spring to radial displacement of the shaft 10, without any impedance to rotation of the shaft 10.

In operation, the shaft 10 is positioned in the elevated position relative to the support plate 12 as shown in FIG. 1, and the support assembly 14 is positioned within roller bearing 170. The turnbuckles 24 and 26, together with the screws 32 and is opposite-side corresponding screw, are adjusted so that the shaft 10, roller bearing 170 and support assembly 14 can all be properly aligned to decrease forces on the shaft 10 while maximizing the damping abilities of the support assembly 14.

The support assembly 14 thus provides a low friction, bearing for rotation of the shaft 10. Also, any radial deflection of the shaft 10 causes corresponding movement the support assembly 14. For example, any deflections of the shaft 10 that causes vertical movement of the shaft 10 will cause resultant shear forces to be applied to the damper members 60 and 62 and cause them to move which dampens the deflective movement of the shaft 10.

Any deflections of the shaft 10 that causes movement of roller bearing 170 in a horizontal direction, e.g., in a direction substantially parallel to the surface of plate 12, will cause corresponding shear forces to be applied to the damper members 40 and 42 and cause them to deflect in the same manner as discussed above in connection with the damper members 60 and 62. Of course, deflections of the shaft 10 in a direction having both a horizontal and a vertical component will cause corresponding movement of all of the damper members 40, 42, 60 and 62 in the manners discussed above.

Thus, use of roller bearing 170 achieves most of the prior benefits of magnetic-type elements as disclosed in the above-identified U.S. patents while using more reliable technology. Additionally, the use of a mechanical bearing such as roller bearing 170 eliminates many of the alignment issues that may possibly come up with respect to use of the magnetic elements. Also, bearings such as roller bearing 170 are smaller, lighter, and less expensive than magnetic elements. Thus, there are no strong axial forces imposed on the shaft that have to be reacted into supporting structure 14 and its damping members. Additionally, bearings such as roller bearing 170 provide less of a blockage for wiring and hydraulics. Also, motion is transferred more efficiently because the mechanical bearing is much stiffer than magnetic disks since there is nothing lost in the spring action between magnets. Additionally, mechanical bearings such as roller bearing 170 may be used when the shaft is part of a curved drive path and may be used with long, flexible, and curved drive shafts while simultaneously providing a source of damping to preclude, for example, excessive motion during start up and dynamic whirl instability while operating at high speeds. The mechanical bearing, such as roller bearing 170, therefore provides a low risk approach to quickly achieve many benefits of supercritical shafting regardless of the presence of grease-lubricated mechanical bearings. For example, the weight and cost benefits achieved with mechanical bearing in place of magnetic elements may be very significant, and a smaller diameter shaft may be used. Further, mechanical bearings, such as roller bearing 170, may provide improved survivability in military applications.

It is understood that the additional support assemblies 14 on the shaft 10 will function in a manner substantially identical to that of the support assembly 14 discussed herein and that, when the shaft 10 is of a considerable length, additional support assemblies 14 can be utilized as needed.

Also, in situations in which a portion or portions of the shaft 10 must be curved by design due to its particular application, the support assembly 14, and any additional identical support assemblies, can easily be positioned relative to the shaft to deflect the shaft into the desired curvature, thereby avoiding the need for angular misalignment couplings.

It is understood that several variations can be made in the foregoing without departing from the scope of the invention. For example, any number of support assemblies 14 can be used at spaced intervals along the shaft 10 to be supported with the number depending on the length of the shaft 10. Also, each roller bearing 170 can be formed by a plurality of roller bearings. Further, the number of damping pads, and therefore the associated plates, in each of the damping members can be varied.

Figure 3:
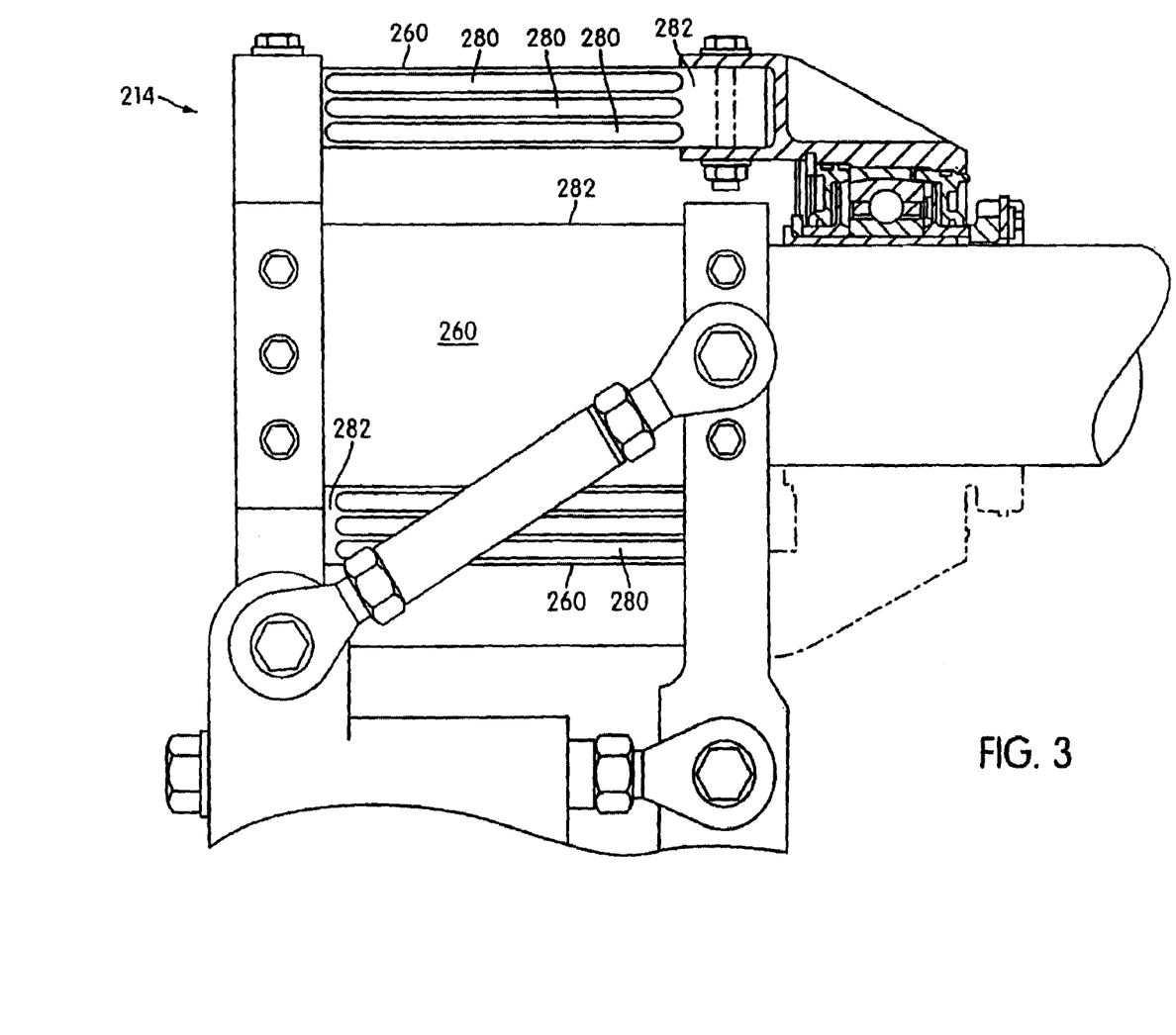
FIG. 3 is a view similar to FIG. 2 but illustrated another illustrated embodiment of the present invention.

FIG. 3 illustrates another embodiment of the invention. Support assembly 214 in FIG. 3 is substantially identical to support 14 described above with respect to FIGS. 1 and 2, except support assembly has four damper members 260 instead of damper members 60, 62, 40 and 42. Whereas damper members 60, 62, 40, and 42 are a laminate of metal sheets and elastomeric material (as fully disclosed in, for example, U.S. Pat. No. 6,268,676, which has been incorporated herein by reference), damper members 260 perform substantially the same function as dampers 60, 62, 40 and 42 but are made as a one-piece, unitary plate member 282 with an elastomeric material 280 positioned within said plate member 282 as seen best in FIG. 4.

Figure 4:
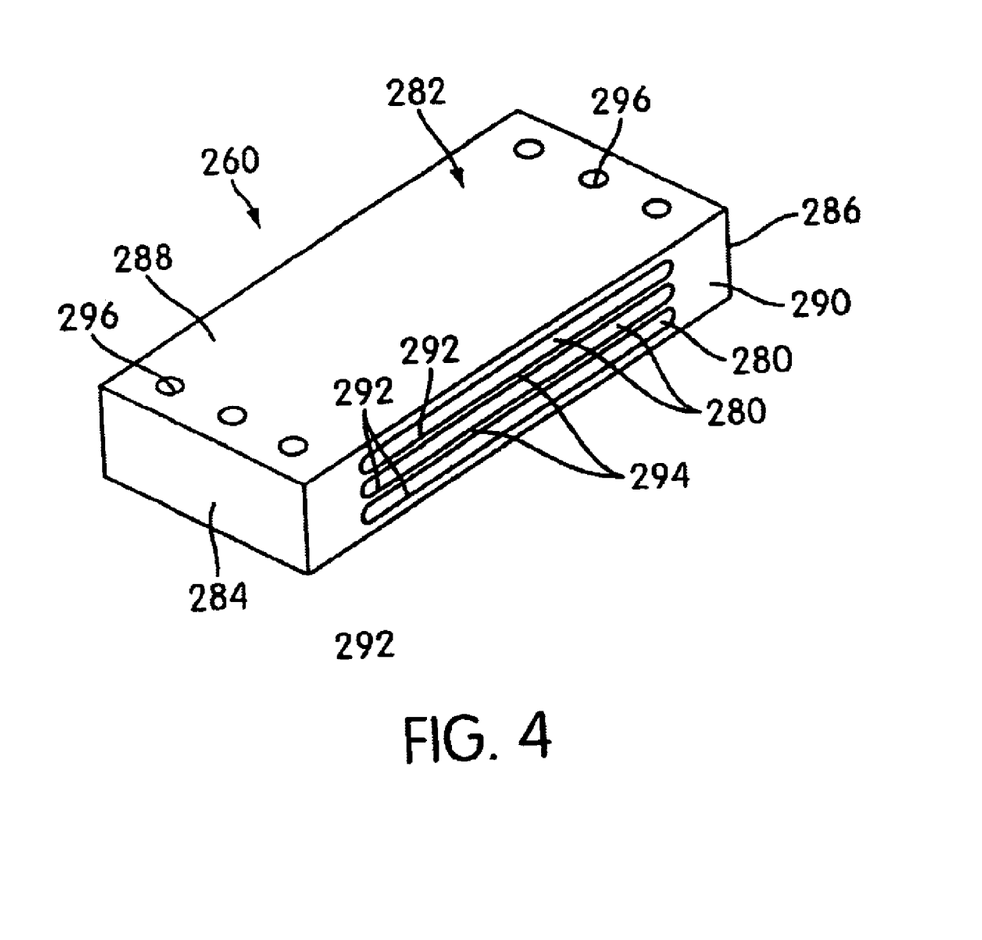
FIG. 4 illustrates a perspective view of a damping member in accordance with another illustrated embodiment of the present invention.

As seen in FIG. 4, plate member has a front 284, a rear 286, a top 288, an opposite bottom (not shown in FIG. 4) and two sides 290. Each side has at least one slot 292 that extends completely through the plate member 282 between the two corresponding apertures on opposite sides of the plate member 282. As illustrated in FIG. 4, the plate member 282 can have multiple slots 292 separated by thin portions 294 of the plate member 282. Elastomeric material 280 is inserted into each slot 292 to provide the desired damping characteristics required from the plate member 282. Plate member 282 has bolt holes 296 extending completely therethrough for attachment of the damping member 260 to the other members of the support assembly 214. Plate member 282 is preferably made from metal such as steel. For example, plate member 282 may be formed by electro-discharge machining from a single piece of corrosion resistant steel.

Figure 5:
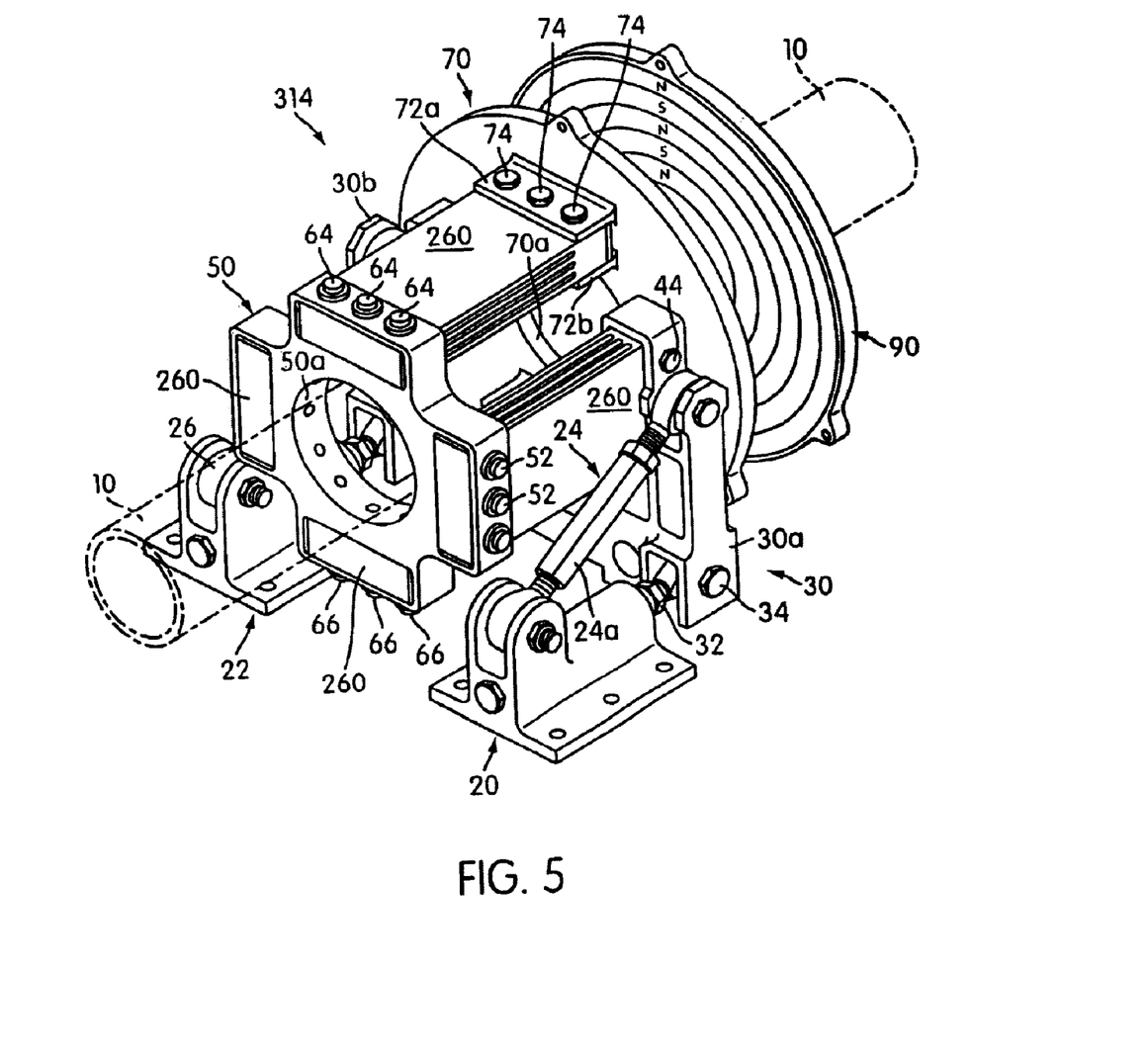
FIG. 5 illustrates a perspective view of a support system in accordance with another illustrated embodiment of the present invention.

FIG. 5 illustrates another embodiment of the present invention. The embodiment of FIG. 5 is substantially identical to the system illustrated, for example, in the above-referenced U.S. Pat. No. 6,427,308, except that instead of using the laminate damping members as previously known, the support assembly 314 uses damping members 260, which are described above with respect to FIGS. 3 and 4. In other words, the support assembly 314 is similar to support assembly 214, except that support assembly 314 employs a magnetic bearing assembly 70, 90 instead of the roller bearing 170 disclosed above.

Figure 6:
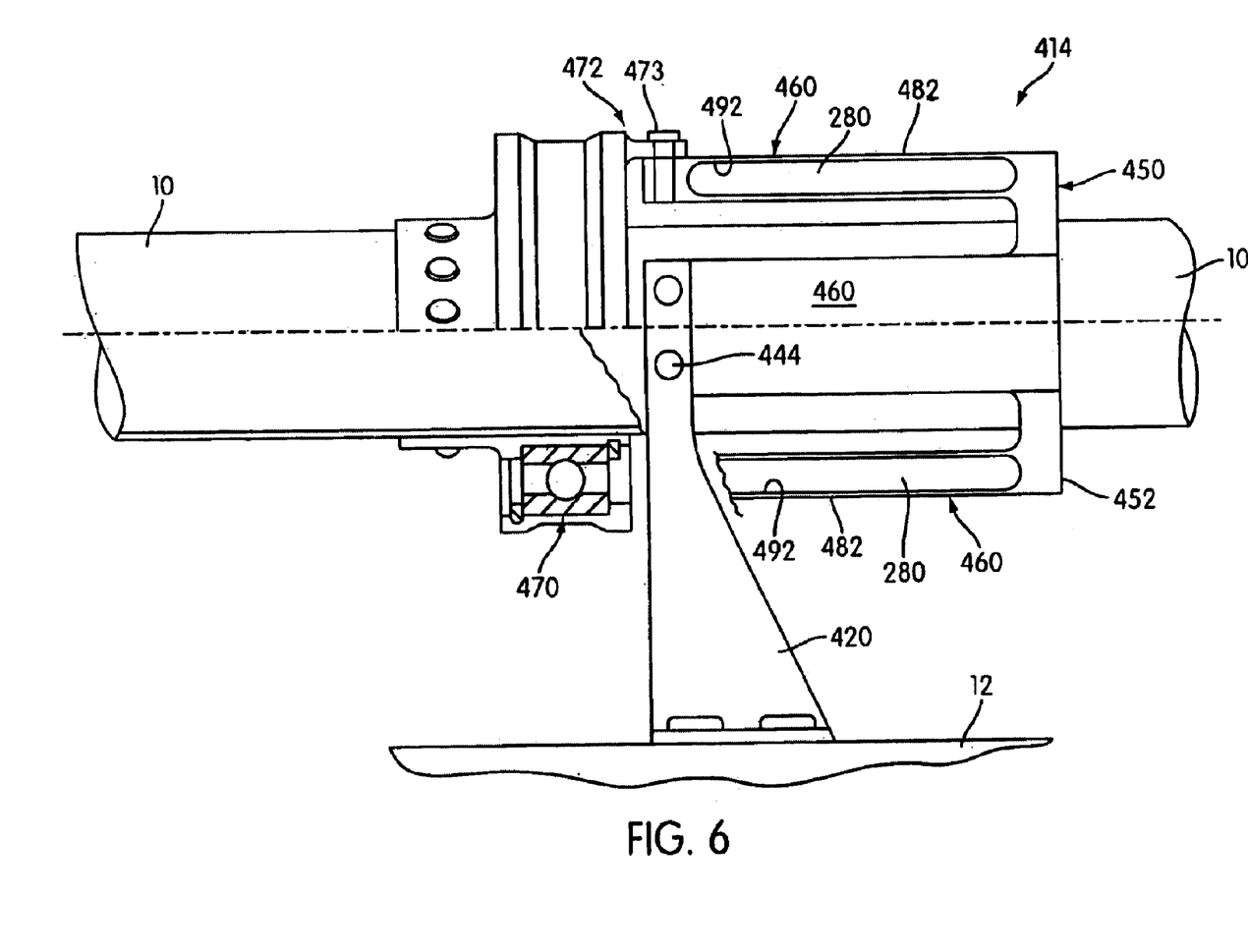
FIG. 6 illustrates a side view of a support system in accordance with another illustrated embodiment of the present invention.
Figure 7:
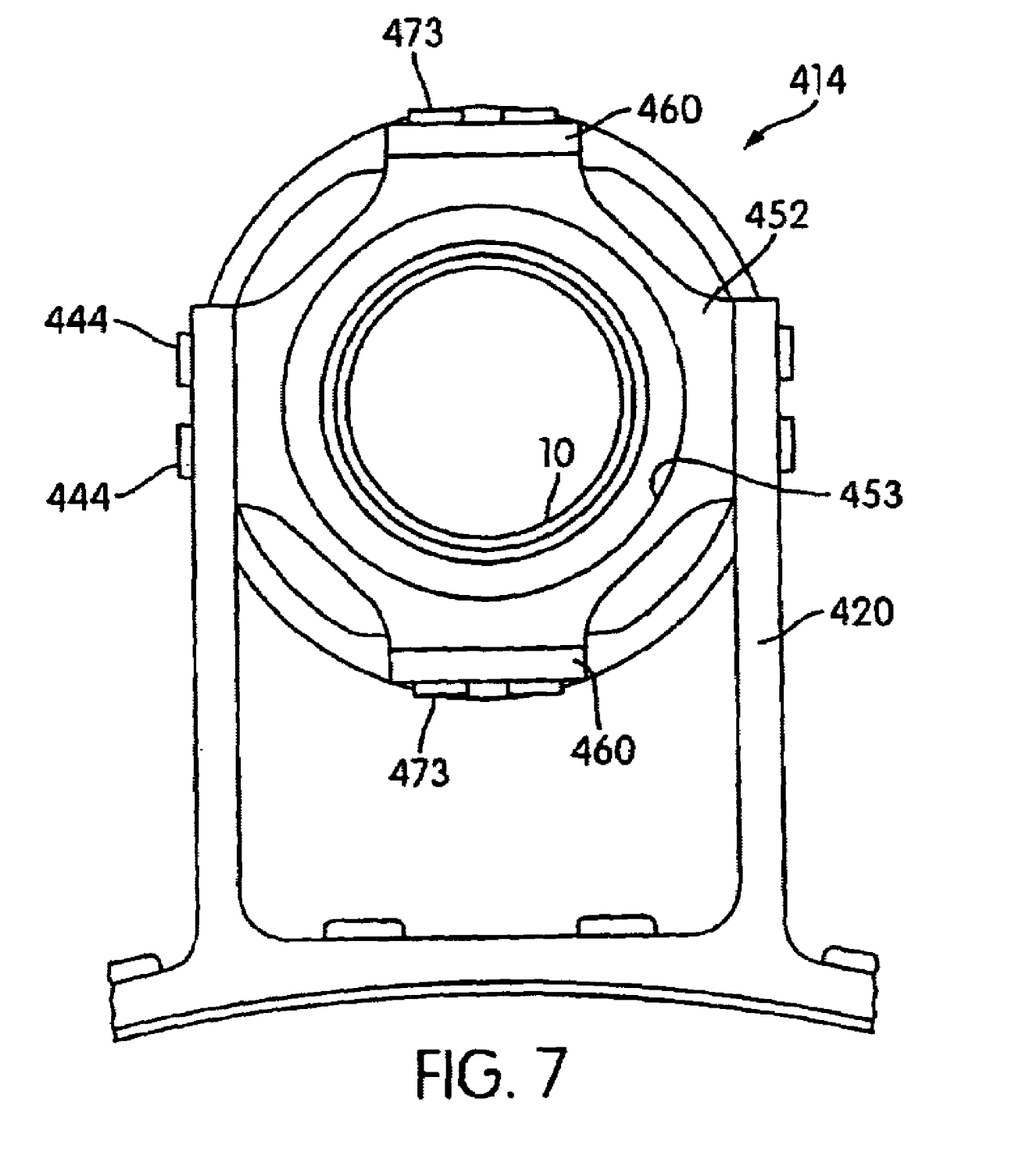
FIG. 7 is a rear view of a the support system illustrated in FIG. 5.

FIGS. 6–7 illustrate another embodiment of the present invention. A support assembly 414 is illustrated that is similar to support assembly 14 illustrated in FIG. 1 except a bracket assembly 450 is employed instead of the assembly of the damping members 40, 42, 60, 62 and the floating bracket 50. That is, bracket assembly 450 replaces the multi-part assembly of damping members 40, 42, 60, 62, bolts, and floating bracket 50. Bracket assembly 450 performs substantially the same functions as the various parts from support assembly 14 that it replaces, except that it, for example, simplifies assembling and replacement associated with those parts it replaces since bracket 450 may be handled as a single part. The bracket assembly 450 is also lighter and more cost-effective than the multi-element part it may replace.

As seen in FIGS. 6 and 7, the support assembly 414 includes a rigid bracket 420 that is rigidly coupled to plate 12. Bracket assembly 450 is attached to bracket 420 by bolts 444 extending through bolt holes 445. Bracket assembly 450 includes four damping members 460 and a floating brace 452. Each of the damping members 460 includes a plate member 482 having a slot 492 that extends completely through its respective plate member 482 in a manner similar to the slots 292 described above with respect to the embodiment of FIG. 4. Each slot 492 is filled with elastomeric material 280 similar to the material used to fill slots 292 above. The elastomeric material 280 can take various forms and can be varied to provide the desired damping characteristics. Preferably the elastomeric material is a high damping elastomer with a high loss coefficient.

It should be understood that although four damping members 460 are illustrated, the number of damping members 40 can be adjusted for the appropriate needs. Also, although only one slot 492 is illustrated, any appropriate number of slots 492 filled with elastomeric material 280 can be used in each damping member 460. For example, there can be three slots 492 in each damping member 460 similar to the three slots 292 illustrated in FIG. 4.

The brace 452 interconnects the four spaced plate members 482 and the four plate members 482 and the brace 452 are formed as a one-piece, unitary bracket. The unitary bracket that forms brace 452 and plate members 482 is preferably made from metal such as steel. For example, the unitary bracket may be formed by electro-discharge machining from a single piece of corrosion resistant steel.

Figure 8:
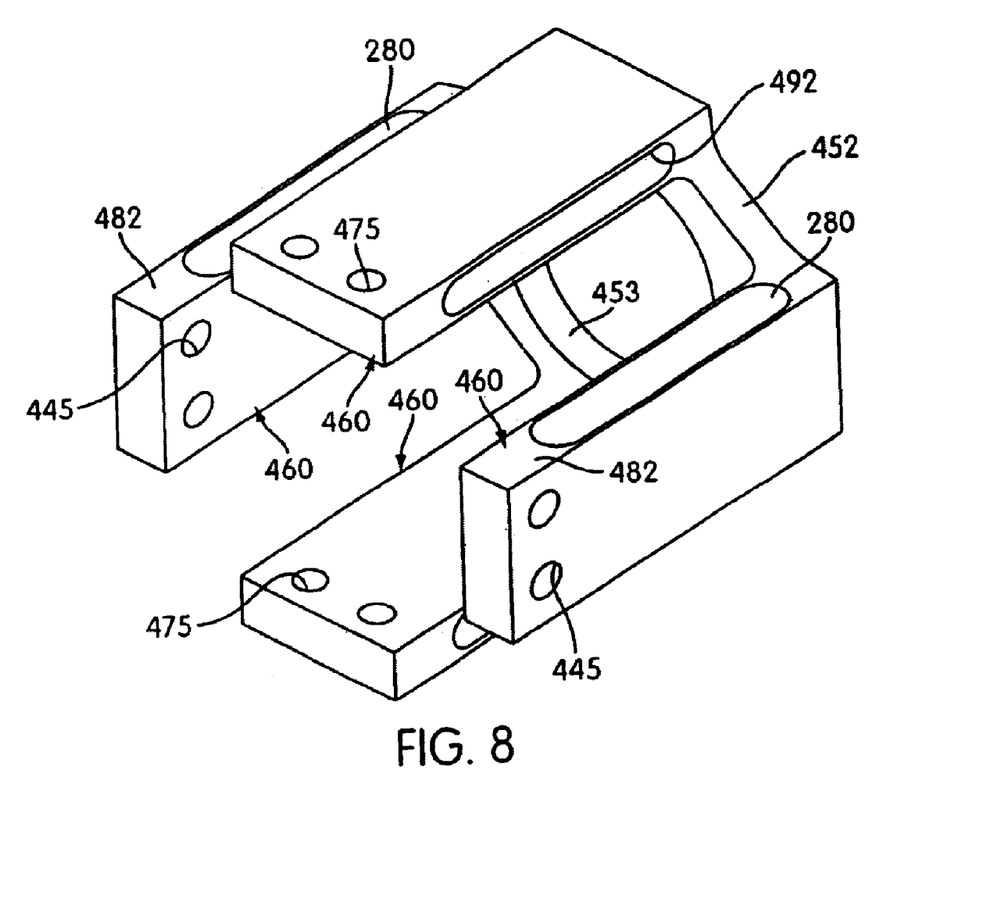
FIG. 8 is a one-piece bracket element in accordance with another illustrated embodiment of the present invention.

Similar to support assembly 14, two of the free ends of the damping members 460 opposite the brace 452 are securably coupled to fixed bracket 420 while the free ends of the other two damping members 460 are securably coupled to a mechanical bearing such as the roller bearing assembly 472. Roller bearing assembly 472 is substantially identical to the roller bearing 170 and the brackets 172a and 172b of support assembly 14, except roller bearing assembly 472 is configured differently to be securably coupled to the two damping members 460. As seen in FIGS. 6 and 7, the securing that occurs between the damping members 460 and the roller bearing assembly 472 is accomplished with bolts 473 extending through bolt holes 475 in damping members 460. The roller bearing assembly 472 includes roller bearing 470, which is substantially identical to roller bearing 170 described above and which securably attaches to shaft 10 in a conventional manner. As seen in FIGS. 6–8, brace 452 includes an opening 453 for receiving shaft 10 extending therethrough.

Thus, the embodiment of FIGS. 6–7 includes a support assembly 414 that achieves all of the supporting and damping benefits afforded by support assembly 14 described above, yet includes a one-piece unitary bracket with elastomeric inserts that can be handled as an single element in place of the multiple elements relied upon in support assembly 14 to provide the necessary damping characteristics described. Additionally, the one-piece, unitary bracket is lighter and less expensive to manufacture than the multiple elements it replaces.

Figure 9:
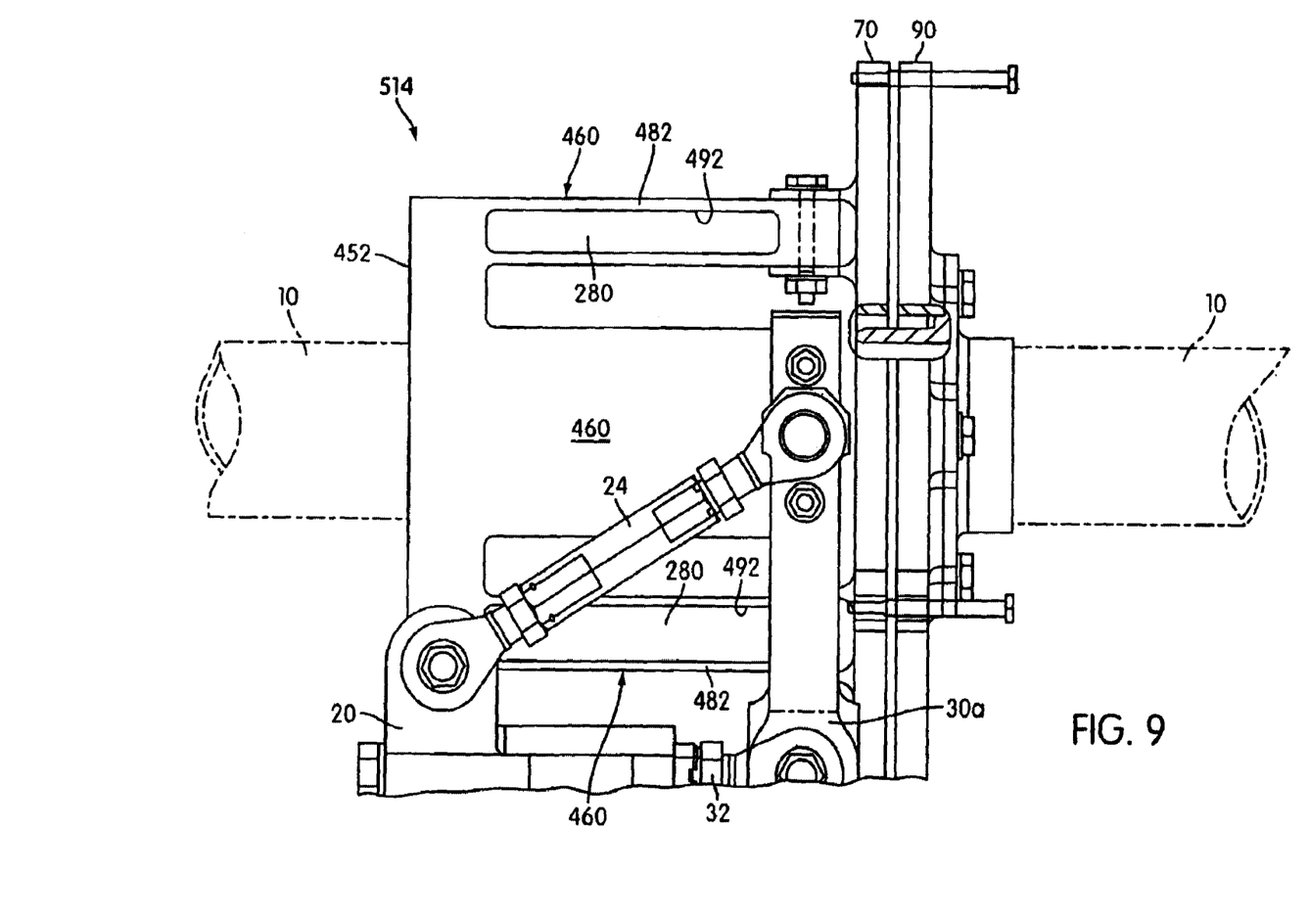
FIG. 9 illustrates a side view of a support system in accordance with another illustrated embodiment of the present invention.

FIG. 9 illustrates yet another embodiment of the present invention. Support assembly 514 illustrated in FIG. 9 is substantially identical to support assembly 414 illustrated in FIGS. 6 and 7 and employs the bracket assembly 450, except the support assembly 514 does not use a mechanical bearing. Support assembly 514 instead employs a magnetic bearing assembly 70, 90 similar to that described above with respect to support assembly 314.

Thus, while the invention has been disclosed and described with reference with a limited number of embodiments, it will be apparent that variations and modifications may be made thereto without departure from the spirit and scope of the invention and various other modifications may occur to those skilled in the art. Therefore, the following claim(s) are intended to cover modifications, variations, and equivalents thereof.

What is claimed is:

1. A support system for a rotating shaft, comprising:
a fixed bracket;
a bracket assembly having a first damping member having a first fixed end and a second movable end, said first fixed end being securably attached to said fixed bracket and said second movable end being movable in a first plane aligned with the shaft, said bracket assembly having a brace securably attached to said second movable end of said first damping member, said first fixed end and said second movable end of said first damping member being independently attached to, respectively, the fixed bracket and the brace, said bracket assembly further having a second damping member having a first end and a second end, said first end being securably attached to said brace and said second end being movable in a second plane that is aligned with the shaft and is generally perpendicular to said first plane; and
a roller bearing securably attached to said second end of said second damping member, said roller bearing being constructed and arranged to provide a mechanical interconnection between said second end of said damping member and the shaft.

2. A support system according to claim 1, wherein
said first damping member includes a first plate member and a first damping element positioned within said first plate member and said second damping member includes a second plate member and a second damping element positioned within said second plate member.

3. A support system according to claim 2, wherein
said first plate member, said second plate member, and said brace together form a one-piece, unitary bracket element.

4. A support system according to claim 3, wherein
each of said first and second damping element is elastomeric material, and
said bracket element is metal.

5. A support system according to claim 2, wherein
said first plate member is a one-piece, unitary member and said second plate member is a one-piece, unitary member.

6. A support system according to claim 5, wherein
each of said first and second damping elements is elastomeric material, and
each of said first and second plate members is metal.

7. A support system according to claim 1, wherein each of said first and second damping members includes a single plate having a central opening extending therethrough and a damping element positioned within said central opening.

8. A support system according to claim 7, wherein said damping element includes a material that substantially occupies an entire space defined within said central opening.

9. A support system according to claim 7, wherein said first plate, said second plate, and said brace together form a one-piece, unitary bracket element.

10. A support system according to claim 1, wherein each of said first and second damping members includes a single plate having a single central opening extending therethrough and a damping element positioned within said single central opening, wherein said damping element includes a material that substantially occupies an entire space defined within said single central opening, and wherein the single plate of said first damping member, the single plate of said second damping member, and said brace together form a one-piece, unitary bracket element.

11. A bracket assembly for supporting a rotating shaft, comprising:
a first damping member having a first end and a second end, said first end being configured to be securably attached to a fixed bracket and said second end being configured to be movable in a first plane aligned with the shaft;
a brace securably attached to said second end of said first damping member, said brace having an opening so that the shaft can pass through said brace; and
a second damping member having a first end and a second end, said first end being securably attached to said brace and said second end being configured to be movable in a second plane that is aligned with the shaft and that is generally perpendicular to said first plane,
said first damping member including a first plate member and a first damping element positioned within said first plate member and said second damping member including a second plate member and a second damping element positioned within said second plate member;
said first plate member, said second plate member, and said brace together forming a one-piece, unitary bracket element.

12. A bracket assembly according to claim 11, wherein each of said first and second damping element is elastomeric material, and
said one-piece, unitary bracket element is metal.

13. A bracket assembly according to claim 12, wherein each of said first and second damping members are cantilevered from said brace and each of said first and second damping members is spaced from each other.

14. A bracket assembly according to claim 13, further comprising:
a third damping member cantilevered from said brace and a fourth damping member cantilevered from said brace, said third damping member having a third plate member and a third damping element positioned within said third plate member, said fourth damping member having a fourth plate member and a fourth damping element positioned within said fourth plate member, and each of said third and fourth damping members being spaced from each other and from each of said first and second damping members.

15. A bracket assembly according to claim 14, wherein said first plate member, said second plate member, said third plate member, said fourth plate member, and said brace together form said one-piece, unitary bracket element.

16. A support system for a rotating shaft, comprising:
a fixed bracket;
a bracket assembly having
a first damping member having a first end and a second end, said first end being securably attached to said fixed bracket and said second end being configured to be movable in a first plane aligned with the shaft,
a brace securably attached to said second end of said first damping member, and
a second damping member having a first end and a second end, said first end being securably attached to said brace and said second end being configured to be movable in a second plane that is aligned with the shaft and that is generally perpendicular to said first plane,
said first damping member including a first plate member and a first damping element positioned within said first plate member and said second damping member including a second plate member and a second damping element positioned within said second plate member,
said first plate member, said second plate member, and said brace together forming a one-piece, unitary bracket element; and
a bearing having a first bearing portion securably attached to said second end of said second damping member, and a second bearing portion structured and arranged to be securably attached to the shaft.

17. A support system according to claim 16, wherein said bearing is a roller bearing constructed and arranged to provide a mechanical interconnection between said second end of said damper member and the shaft.

18. A support system according to claim 16, wherein said bearing is a magnetic bearing having first and second magnetized members.

19. A support system for a rotating shaft, comprising:
a fixed bracket;
a first damping member having a first end and a second end, said first end being securably attached to said fixed bracket and said second end being configured to be movable in a first plane aligned with the shaft,
a floating bracket securably attached to said second end of said first damping member, and
a second damping member having a first end and a second end, said first end being securably attached to said floating bracket and said second end being configured to be movable in a second plane that is aligned with the shaft and that is generally perpendicular to said first plane,
said first damping member including a first plate member and a first damping element positioned within said first plate member and said second damping member including a second plate member and a second damping element positioned within said second plate member,
each of said first plate member and said second plate member being formed as a one-piece, unitary plate member; and
a bearing having a first bearing portion securably attached to said second end of said second damping member, and a second bearing portion structured and arranged to be securably attached to the shaft.

20. A support system according to claim 19, wherein said bearing is a roller bearing constructed and arranged to provide a mechanical interconnection between said second end of said damper member and the shaft.

21. A support system according to claim 19, wherein said bearing is a magnetic bearing having first and second magnetized members.

* * * * *